(12) United States Patent
Mann

(10) Patent No.: US 6,374,399 B1
(45) Date of Patent: Apr. 16, 2002

(54) APPARATUS AND METHOD FOR PROVIDING LIST AND READ LIST CAPABILITY FOR A HOST COMPUTER SYSTEM

(75) Inventor: Daniel Mann, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/295,977

(22) Filed: Apr. 21, 1999

(51) Int. Cl.[7] .................................................. G06F 9/44
(52) U.S. Cl. ...................... 717/4; 717/4; 717/5; 717/7
(58) Field of Search .................. 717/7, 4, 9, 5; 715/5; 714/38

(56) References Cited

U.S. PATENT DOCUMENTS 5,493,675 A * 2/1996 Faiman, Jr. et al. ........ 395/700
5,815,653 A * 9/1998 You et al. ...................... 717/4
5,819,093 A * 10/1998 Davidson et al. ........... 395/704
5,892,941 A * 4/1999 Khan et al. ..................... 717/4

OTHER PUBLICATIONS

Programmer Reference, "TLA Programmatic Interface (TPI)/TLA 700 Series Logic Analyzer", Tektronix, Inc., WIlsonville, OR, pp. 1–120 (admitted prior to Apr. 21, 1999).

* cited by examiner

Primary Examiner—Tuan Q. Dam
Assistant Examiner—Chuck O Kendall
(74) Attorney, Agent, or Firm—Zagorin, O'Brien & Graham, LLP

(57) ABSTRACT

A host computer system is coupled to a target computer system in a computer system debug environment and accesses selected resources. A first function executed on the host, encodes a data structure with target resource descriptor information for at least one of the selected resources. A second function accesses the selected resources in accordance with the target resource descriptor information encoded in the data structure.

23 Claims, 3 Drawing Sheets

APPARATUS AND METHOD FOR PROVIDING LIST AND READ LIST CAPABILITY FOR A HOST COMPUTER SYSTEM

BACKGROUND OF THE INVENTION

1. Field of the Invention

This invention relates to debugging a computer system and software functions associated therewith.

2. Description of the Related Art

The time and cost of developing and debugging new hardware and software products is a significant factor in product development. A capable and cost efficient debug environment can decrease the cost and time to bring a new product to market. The need to provide software debug support is particularly acute within the embedded products industry, where specialized on-chip circuitry is often combined with a processor core.

Logic analyzers, read-only memory (ROM) emulators and in-circuit emulators (ICE) have commonly been used to help provide debug support. In-circuit emulators do provide certain advantages over other debug environments, offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

A variety of hardware solutions with varying on-chip debug capability through various debug ports are being provided by the various processor manufacturers. One approach used by some advanced processors multiplex debug pins in time. In such processors, the address bus is used to report software trace information during a BTA-(Branch Target Address) cycle.

A common approach is to use a serial interface such as provided by IEEE 1149.1 (Joint Test Action Group (JTAG)), for providing debug support. In such an approach, the debug hardware provided on chip communicates with a host debug computer through the JTAG port.

In the "Background Debug Mode" by Motorola, Inc. limited on-chip debug circuitry is provided for basic run control. Through a dedicated serial link requiring additional pins, a debugger can start and stop the target system and apply basic code breakpoints by inserting special instructions in system memory. Once halted, special commands are used to inspect memory variables and register contents.

Thus, the debug tool manufacturers are faced with a wide variety of processor and hardware debug approaches that they are required to support. Typically a common core debug capability is shared among the various approaches, particularly among product offerings from the same manufacturer. For instance, many debug tools support the capability to start and stop the processor, read and write to various storage locations within the processor and/or target system and to set breakpoints. However, every time a new or modified debug port is provided on a processor, new software has to be generated by the debug tool vendors to support the new or modified ports. It would be desirable to limit the amount of new software that has to be generated by the debug tool vendors in response to enhancements or changes to debug hardware on target microprocessors. In addition, it would be desirable to standardize software interfaces as much as possible in order to help achieve that goal.

SUMMARY OF THE INVENTION

Accordingly, the invention provides for a standard procedural interface operating on a host computer. In one embodiment the invention provides a host computer system for operating in a debug environment that includes a target computer system coupled to the host computer system. The host computer system includes a data structure storing selected target resource information. Each element in the data structure stores information identifying a selected target resource. The host computer also includes a programming interface encoded in computer readable media and executable on the host computer system that provides at least one function causing the host computer system to access a selected set of target resources according to the selected target resource information.

In another embodiment, the invention provides a method for accessing selected resources in computer system debug environment that includes a host computer system. The method includes, on the host computer system, calling a first function. The first function encodes a data structure with target resource descriptor information for at least one of the selected resources. Thereafter, the method calls a second function that accesses the selected resources in accordance with the target resource descriptor information encoded in the data structure.

BRIEF DESCRIPTION OF THE DRAWINGS

The present invention may be better understood, and its numerous objects, features, and advantages made apparent to those skilled in the art by referencing the accompanying drawings.

Note that the use of the same reference symbols in different drawings indicates similar or identical items.

DESCRIPTION OF THE PREFERRED EMBODIMENT(S)

As discussed, different processor manufacturers implement their implement their debug port differently for various reasons. However, the differences in port implementation may be hidden behind a procedural interface layer which is used by tools driving the debug connection between the target processor and the host debug computer.

Figure 1:
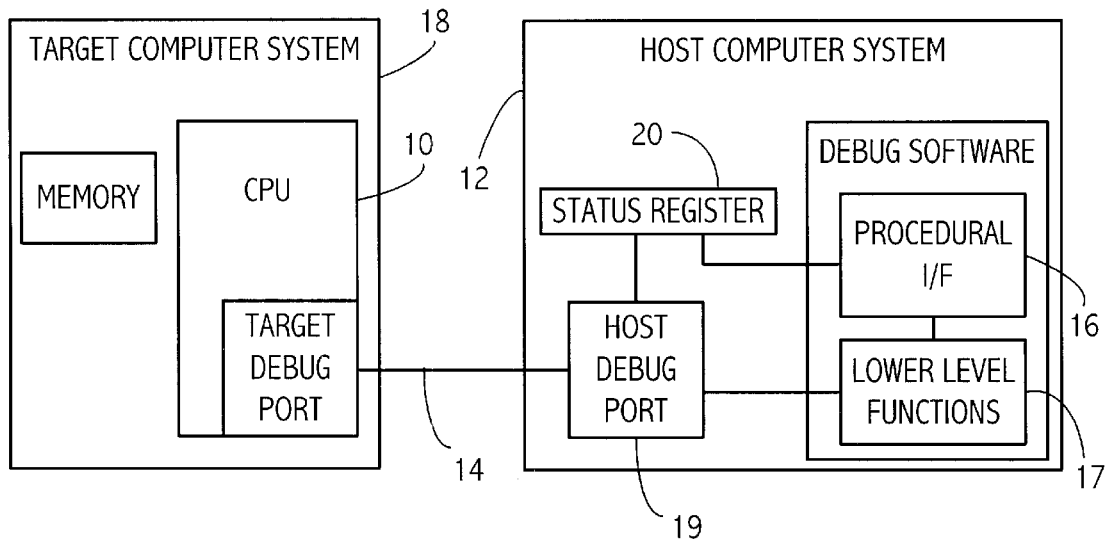
FIG. 1 is a block diagram of a target and host computer system in a debug environment.

FIG. 1 shows the major software and hardware blocks of a debug environment implementing an embodiment of the present invention. Target processor 10 is coupled to the host computer system 12 via bus 14. Bus 14 may be any of a variety of buses. For example, bus 14 may be implemented in accordance with IEEE 1149.1 (JTAG) or variations thereof. Note that the processor that comprises target processor 10 can vary, particularly in the areas of on-chip registers and breakpoint control mechanisms. Target computer system 18 may be a single integrated circuit such as may be found in embedded processor applications or may include multiple integrated circuits including processor, memory and other integrated circuits.

The present invention defines a low-level procedural interface 16 for the services provided by the lower level functions 17 implementing a debug driver. The low level services described herein are implemented by a group of functions which together provide a software debug driver. By agreeing on a standard procedural interface for controlling the host debug port 19, tool development complexity and costs can be reduced.

However, implementation details of lower level services can vary according to specific processor implementation and target hardware debug port implementation. For example, if a JTAG port is the debug port that is available on a particular processor, the low level routines that actually toggle the JTAG lines appropriately to read and write information to the JTAG port on the target system will differ from the routines that are provided if a more robust debug port is provided on the target system. An exemplary target debug port is described in "Debug Interface Including a Compact Trace Record Storage", application Ser. No. 08/992,361, filed Dec. 17, 1997, naming Daniel Mann as an inventor, which is incorporated herein by reference. However, the procedural interface described does not have to change according to each change in implementation of debug hardware on the target processor. For those systems that have more advanced ports, the procedural calls described herein may end up running more efficiently.

As is known in the art, execution of a computer process involves a calling hierarchy of proceedings, functions, routines or methods. Although the terms procedure, function, routine and method may have distinct meanings in other contexts, e.g., the particular programming environment being utilized, for purposes of this description, groups of software instructions which may be called or invoked are generally referred to herein as functions without loss of generality. Table 1 describes an exemplary group of functions which provide a set of functions operable in the host computer to support target services.

TABLE 1

| Function | Type | Operation |
|---|---|---|
| Read | Kernel debug | Read from processor or system resource |
| Write | Kernel debug | Write to processor or system resource |
| Verify | Kernel debug | Verify data written to target |
| Fill | Kernel debug | Fill resources with pattern |
| Move | Kernel debug | Move data between target spaces |
| List | Kernel debug | List of target resources for later reading |
| ReadList | Kernel debug | Read preprogrammed target list |
| Go | Kernel run | Start processor execution |
| Step | Kernel run | Single step processor execution |
| Break | Kernel run | Stop processor execution |
| Reset | Kernel run | Reset processor and system resources |
| Status | Port operation | Examine status of debug port |
| Wait | event detection | Wait for port provided data or an event |
| Send | App./OS Communications | Send data to processor without halting |
| Receive | App./OS Communications | Receive data from communication link |
| Version | Support | Inquire HW and SW version |
| Attach | Support | Attach driver hardware to target system |
| Error | Support | Convert error number to text string |

The various functions in Table 1 are described in more detail below. The notation <in>refers to a parameter passed to the service routine, and <out>refers to an output value, that is a pointer which will be referenced to obtain a memory location updated by the successful completion of the service routine. Passing output parameters by reference is exemplary and other approaches to pass parameters (e.g. by value) are known in the art and also within the scope of this invention. The commands grouped under the type "kernel debug" are used when the processor is not running; that is, when kernel mode debugging is being performed. The "kernel debug" and "kernel run control" commands are issued to a stopped processor. The other commands provide for run-time communication with the target, and control of the host debug system.

A debug service may return an error code. Each service returns an enumerated value of type return_error_t. An exemplary corresponding enumeration is shown below:

typed ef enum
   {NO_ERROR=0,
   PARAMETER_ERROR=1,
   COMMAND_NOT_SUPPORTED=2,
   NOT_ATTACHED=3,
   NOT_STOPPED=4,
   VERIFY_FAILURE=5,
   NO_POWER=6,
   NOT_CONNECTED=7,
   INTERNAL_ERROR=8,
   INTERNAL_TIME_OUT=9,
   BUFFER_FULL=10,
  }return_error_t;

It is often more convenient to have a text string describing an error, rather than a simple error code number. The Error( ) routine returns a string describing the error number passed. The ErrorString parameter points to a pointer which will be set to the address of the selected character string.

```
return_error_t Error (
    int ErrorNumber1           <in>
    char**ErrorString,         <out>
    INT32 debug)               <in>
```

The Attach( ) function establishes a connection with the target processor. In an x86 debug environment, the target x86 processor always runs in little-endian, but the host processor may run in big-endian or little-endian. If the host wishes data structures passed to this driver to be converted from little-endian to big-endian, it may set the <HostEndian> parameter to non zero.

```
return_error_t Attach(INT32 HostEndian)       <in>
```

The Read( ) function reads target and system resource into a buffer in the host system known as the object array. The data takes the form of objects of size ObjectSize bytes. They could be read from contiguous memory, register or other address space. The number of objects read is given by ObjectCount.

An exemplary Read( ) call is shown below:

```
return_error_t Read(INT32 TargetSpace,       <in>
                    UINT32 TargetAddress,    <in>
                    INT32 ObjectSize,        <in>
                    INT32 ObjectCount,       <in>
                    void* pBuffer)           <out>
```

The selected target space, starting at address TargetAddress, is read into the host buffer pointed to by pBuffer.

The TargetSpace parameter selects the target address space. Each processor has an enumerated list of address spaces, such as memory, register, I/O, cache and more. It is up to the function caller to be aware of the space enumerations applicable for the target processor in use.

For example, target space may be:

0=physical memory space

1=I/O space

2=registers

3=serial communication parameters

4=raw trace data

5=unused

It may be assumed in certain embodiments that the calling function is aware of any address boundary limitations which apply to reading objects from target memory in order to simplify the function. If that is the case, access violations or alignment faults which occur will not be dealt with by the Read( ) function and may not be reported. Zero is returned on normal completion. If an error is detected, then a non-zero error number is returned. A more complex implementation may account for access violation or alignment faults in a variety of target processors.

The serial communication parameters space ID can be used to obtain information about host buffers utilized by the Send( ) and Receive( ) routines. A transmit (TX) buffer in the host may be used to store data transmitted by the target processor to the host. A receive (RX) buffer may be used by the host to store data to be received by the target processor. The size of the buffers may be e.g., 4K. Other sizes are of course possible and will depend on implementation details of particular host systems. When this space ID is used, an array of four 32-bit objects are returned:

space available in RX buffer size of RX buffer unused space in TX buffer size of TX buffer.

The function Write( ) is the reverse of Read( ), it moves an array of objects into the target processor or system from the memory buffer pointed to by pBuffer. No attempt is made to verify the data is successfully written.

An exemplary Write( ) call is shown below.

| return_error_t Write(INT32 TargetSpace, | <in> |
|---|---|
| UINT32 TargetAddress, | <in> |
| INT32 ObjectSize, | <in> |
| INT32 ObjectCount, | <in> |
| void *pBuffer) | <in> |

Another exemplary TargetSpace parameter, which may be local to a particular function, may be used to indicate the target address space as follows:

0=physical memory space

1=I/O space

2=register

3=not used

After a Write( ) has been used, the Verify( ) function can verify the write was successful. The same pBuffer supplied to Write( ) is provided again. This time the target data is read and confirmed with the pBuffer data. If they match, zero is returned.

An exemplary Verify call is shown below:

| return error_t Verify(INT32 TargetSpace, | <in> |
|---|---|
| UINT32 TargetAddress, | <in> |
| INT32 ObjectSize, | <in> |

| | | |
|---|---|---|
| | INT32 ObjectCount, | <in> |
| | void *pBuffer) | <in> |

The TargetSpace parameter may indicate target space as follows:

When the same data value must be written to target memory (or other address space), the Fill( ) function rather than Write( ) can be used. In that case only a single data object is provided in place of the array of objects pointed to by pBuffer. That can be very useful when writing zero or FF . . . FF to memory. An exemplary Fill( ) call is shown below:

| return_error_t Fill(INT32 TargetSpace, | <in> |
|---|---|
| UINT32 TargetAddress, | <in> |
| INT32 ObjectSize, | <in> |
| INT32 ObjectCount, | <in> |
| UINT32 value) | <in> |

The Move( ) function copies data from one location to another within the same target space. As with other Debug functions, Object size is in bytes and ObjectCount determines the number of objects copied. An exemplary Move( ) call is shown below:

| return_error_t Move(INT32 TargetSpace, | <in> |
|---|---|
| UINT32 SourceAddress, | <in> |
| UINT32 DestinationAddress, | <in> |
| INT32 ObjectSize, | <in> |
| INT32 ObjectCount) | <in> |

When execution stops, it is frequently necessary to examine a recurring set of target resources; such as the program counter, status register and the like. One way to do this is to first program a list of desired resources using the function List( ). The passed parameter pTargetList points to a data structure having entries describing target resources, in the form shown below:

```
typedef struct
{       char            space;
        UINT32          address;
        char            size;
} object_list_t
```

Figure 2:
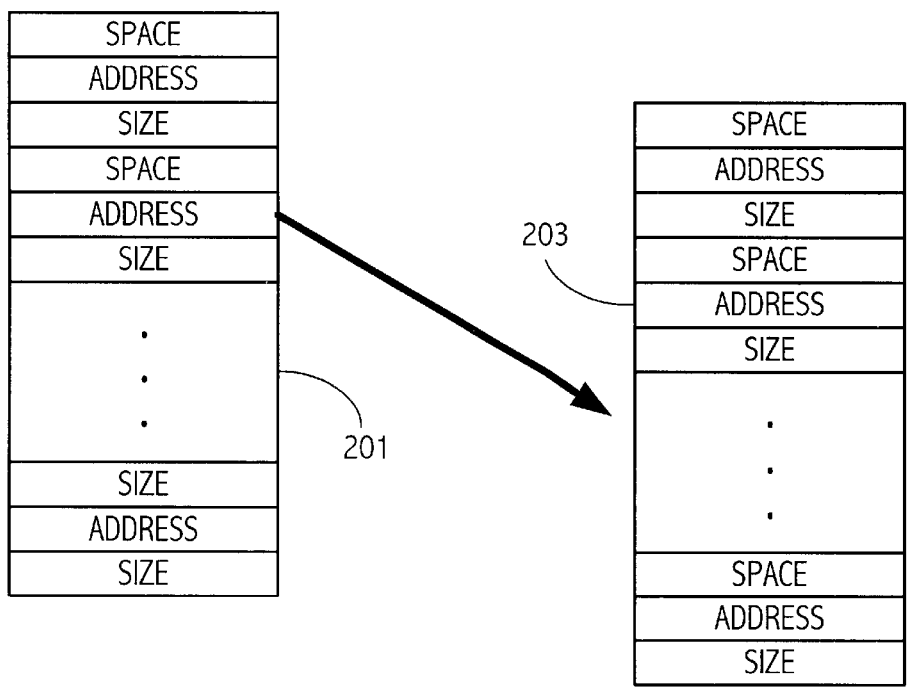
FIG. 2 illustrates operation of a List( ) function according to one embodiment of the invention.

The number of entries in the data structure is given by ObjectCount. The List function can copy the array (list) into a location which can be accessed when ReadList( ) is called. Referring to FIG. 2, an exemplary list is shown at 201 having n elements in the data structure, with each element including a space, address and size parameter. The size of the list n is given by ObjectCount. The List( ) function moves the data structure at 201, which may be created interactively on the screen, to the data structure stored at 203 which is accessible by the ReadList( ) function. An exemplary List( ) call is shown below.

| return_error_t List(object_list_t pTargetList[], | <in> |
|---|---|
| INT32 ObjectCount) | <in> |

The list can be changed at any time by making a call to List( ) and presenting a new list of resources. A list typically contains a list of target registers which are examined at each processor halt, such as the program counter and breakpoint control registers. Note that various embodiments are possible with the ReadList( ) function. For instance, while the whole list may be copied over, in another embodiment, a target resource could be added to the data structure at 203 by invoking List( ). In that way, the list could be "grown" one target resource at a time. In another embodiment, multiple lists may be maintained.

A call to the function ReadList( ) fills the buffer pointed to by pBuffer with target resource information which was previously selected and is stored in 203. Any target resource can be examined, and in any prescribed sequence. An exemplary ReadList( ) call is shown below:

return_error_t ReadList(object_list_t pBuffer[])    <in>

Figure 3:
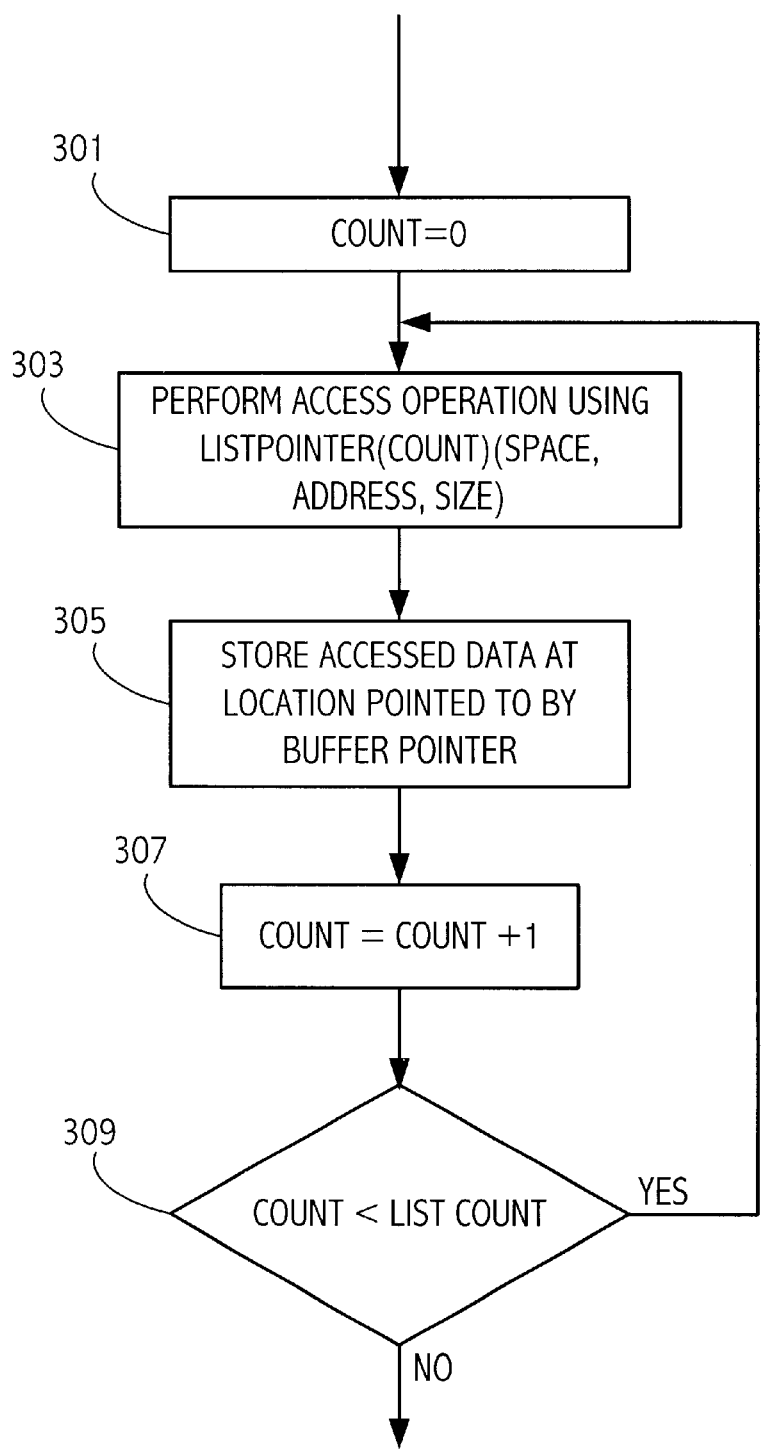
FIG. 3 illustrates operation of a ReadList( ) function according to one embodiment of the invention.

FIG. 3 illustrates the operation of the ReadList( ) function. Assume the size of the list is passed as a parameter or available as a global parameter. The count value, used as the loop counter, is initialized to zero in 301. An access operation is performed in 303 (such as a read operation) using the information contained in one element of the list pointed to by listpointer. The accessed data is stored at a location pointed to by the buffer pointer in 305. The count is incremented in 307 and compared to determine if the end of the list has been reached in 309. If not, the access command accesses the next target resource identified in the list. Note that if multiple lists are maintained, e.g., when using multiple break points, the function also has to be told which list to traverse. Thus, the use of the ReadList( ) function in conjunction with the List( ) function provides a useful way to access target resources.

When a processor is halted, execution can be restarted by calling the function Go( ). The processor may continue to run until an event causing it to re-enter debug mode is encountered. The Go( ) function returns after starting processor execution. It does not wait to return after execution possibly stops at some time in the future.

return_error_t Go( )

Most processors are equipped with some means of single-stepping an assembly-level instruction. A call to the function Step( ) initiates a single-step, and the function returns immediately. With some processors, a single-step may cause the execution of emulation routines or other support software, which is target dependant. Consequently, the address where the processor next stops can not always be assumed from the address in use when the single-step order was issued. An exemplary Step call is shown below:

return_error_t Step(INT32 StepCount)    <in>

The Version( ) function obtains software driver information as well as hardware identification information. For example, SwVersion and HwVersion maybe 32-bit values divided into 3 fields. SwVersion, (16-bit Software provider ID)(8-bit major number)(8-bit minor number) and HwVersion, (16-bit Hardware provider ID)(8-bit major number)(8-bit minor number). An exemplary Version( ) call is shown below:

return_error_t Version(UINT32* SwVersion,    <out>

UINT32* HwVersion)    <out>

Calling the Break( ) function causes processor execution to be immediately (or as quickly as possible) stopped. The processor may enter a debug mode state and await kernel mode debug commands. An exemplary Break( ) call is shown below:

return_error_t Break( )

The Reset( ) function activates a processor or system reset. An enumerated parameter <Type> can be used to select the desired reset operation. If the processor is already halted in Debug mode when reset is requested, the processor may immediately reenter Debug mode after the processor reset sequence is performed.

A processor which is running while a reset is requested, may reset and then continue running unless the enter-debug-mode-on-reset option has been selected by the processor. An exemplary Reset( ) call is shown below:

return_error_t Reset(INT32 Type)    <in>

The Status( ) function provides the content of a status register 20 (see FIG. 1), which in one embodiment is a 32-bit status word. The term status register is a term intended to cover a memory location of any appropriate number of bits or bytes as is appropriate for any particular host system. In one embodiment the upper 16 bits are debug driver and processor dependent. The lower 16-bits may be reserved. The Status( ) function can preferably be called at any time without stopping target execution. Depending on the processor state, several status bits may be set at the same time. Seven exemplary status bits are shown below which are processor and debug driver independent. Other status bits in other implementations may of course be utilized.

| | |
|---|---|
| bit 1 | Target is Stopped (*R/S) |
| bit 2 | The buffer holding data to be sent to the target is full (*RX) |
| bit 3 | Data sent by the target has arrived (TX) |
| bit 4 | The target is no longer connected |
| bit 5 | The target has lost power |
| bit 6 | The target is in reset |
| bit 7 | The target state is unknown |
| bit 8–16 | Reserved |

The (RIS) bit indicates if the processor is currently running or not. The RX bit indicates that the buffer holding data to be sent to the target via the Send( ) command is full. The TX bit indicates that the processor has transmitted data to the host and it should be collected via a call to Receive( ). Thus, the status register can include status information of both the host system and the target system. An exemplary call is shown below:

return_error_t Status(UINT32 *status)    <cout>

Figure 4:
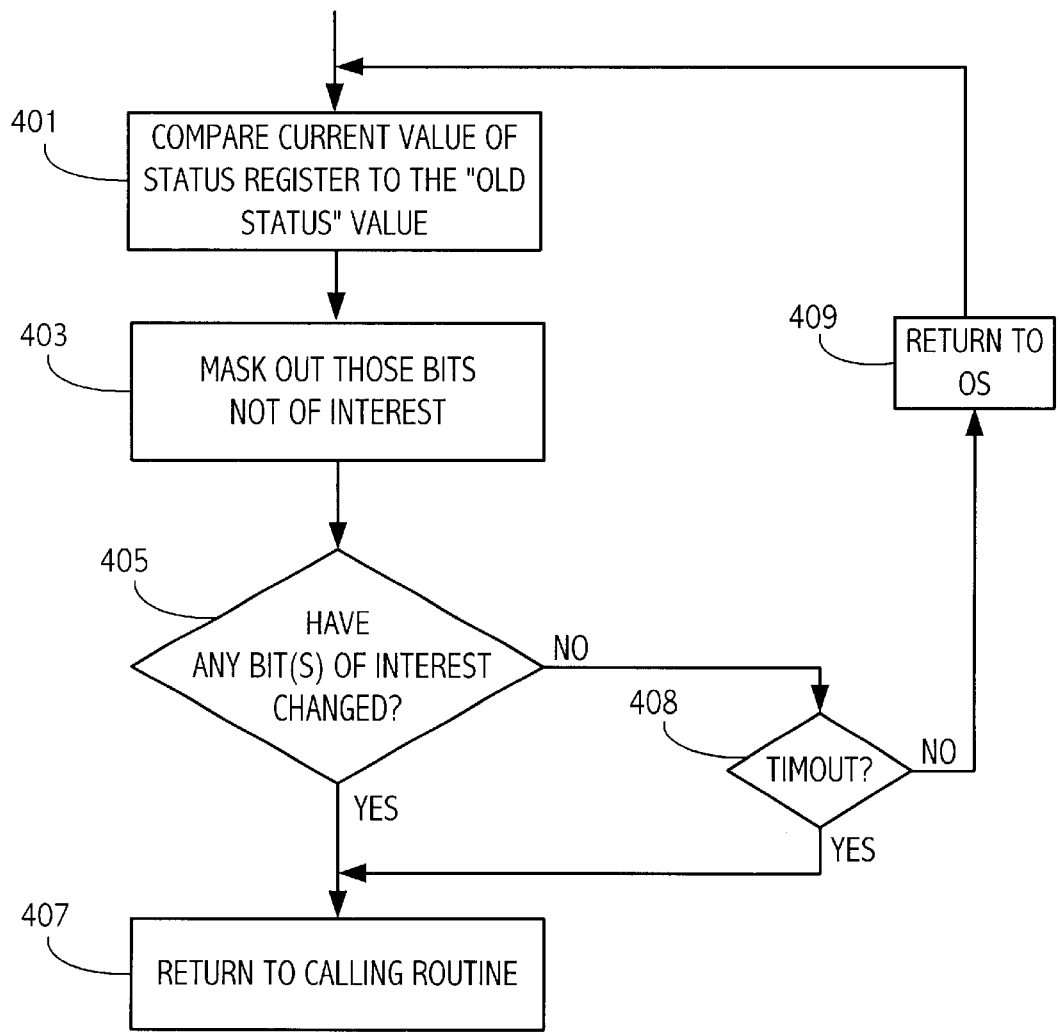
FIG. 4 is a flow diagram illustrating a wait function according to one embodiment of the invention.

The Wait( ) function has similarities to the Status function. One difference is that the Wait( ) may not return immediately. A wait-test condition is verified before the function returns. The call to the Wait( ) function passes a parameter containing a predetermined compare value along with a Mask parameter. The wait-test operates as illustrated in FIG. 4. Once the function is called, the function compares the current value of the status register to the compare value in 401 to see if any bits have changed. The predetermined value may be, e.g., an old value of the status register. The predetermined value may also be a then current value of the status register (when passed as a parameter) and the calling function wants to know when the status register changes from its then current value. Of course the compare parameter can be any value desired. The compare in 401 can be accomplished by XORing the current value with the compare value. The results from 401 indicates those bits that have different values from the predetermined value as non-zero bits. Only certain of the bits may be of interest. The mask parameter identifies those bits. Those bits that are of interest are determined by binary ANDing the result of 401 with the mask parameter in 403. If the result of 403 is non-zero that means that bits of interest have changed from the "old status" value. If the result is non-zero, the function returns to the calling function in 402.

Otherwise the function waits for a bit of interest to change by returning to 401 to again compare the current value of the status register with the predetermined value. In order to avoid a lock-up situation, a timeout may be provided as shown in step 408. After a delay, for example, of 30 seconds, Wait( ) may return to the calling function with a time-out error if the time out condition is defected in 408. In addition, a call to Wait( ) need not block execution of other host software depending of course on the operating system being utilized on the host. For instance, the function may make a call to the host operating system at 409 enabling the execution thread of the wait function to be suspended for a period of time and allowing other tasks operating in the operating system to continue. In that way, system resources are not continually tied up.

The wait function enables a change in a status bit value to be detected. Should any one of the selected bits change, the Wait( ) function returns. Until the necessary change condition is detected, the function can block execution of the host thread that called the Wait( ) function.

The current status value is returned in NewStatus; Wait( ) normally returns NO_ERROR. However, it may return immediately, or at any time, with a non zero error value indicating why the Wait( ) call can not proceed. If no bits of interest have changed, the function returns to 401 and continues to check for a change in the current status value.

An exemplary Wait( ) call is shown below:

| | | |
|---|---|---|
| return_error_t Wait(UINT32 Mask, | | \<in\> |
| | UINT32 OldStatus, | \<in\> |
| | UINT32 NewStatus) | \<out\> |

The Send( ) function allows date to be sent to the running processor. The Send( ) function is used to send Length characters from the buffer pointed to by pBuffer to the target processor. The function returns before the transfer has been accomplished. That requires the pBuffer data to be temporally held in a local driver buffer before transmission to the target. If Send( ) is unable to accept the data for transmission then it returns a non zero error value, otherwise it returns zero.

The status bit STATUS_RX_FULL returned by Status( ) and Wait( ) can be used to determine when the debug driver is ready to transmit more data. The amount of available buffer space can be determined by calling Read( ). If \<ByteCount\> is greater than the currently available space, the Send( ) will be completely rejected.

The driver may break the data into byte or word sized portions before transporting them to the target. It is up to target resident software to support an interrupt or poll-mode routine to receive and process the data. Typically this is built into the target operating system. The Send( ) function applies no meaning to the data, it merely ensures transmission. An exemplary call to Send( ) is shown below:

| | |
|---|---|
| return_error_t Send(INT32 ByteCount, | \<in\> |
| char *pBuffer) | \<in\> |

Whenever the debug driver determines the target processor has data which it wishes to transfer to the host, the data will be read by the driver and held in a local host buffer. Via Status( ), a debug user can determine there is data waiting in the receive (TX) buffer. If a Receive( ) is not immediately issued, the data will continue to accumulate in the driver's buffer.

The Receive( ) function copies the data from the receive queue into the buffer pointed to by pBuffer. The buffer's length is given by Length. The number of bytes actually copied is returned in *Count. An exemplary call to Receive( ) function is shown below:

| | |
|---|---|
| return_error_t Receive(INT32 Length, | \<in\> |
| char* pBuffer, | \<out\> |
| INT32* Count) | \<out\> |

The description of the invention set forth herein is illustrative, and is not intended to limit the scope of the invention as set forth in the following claims. For instance, in certain embodiments, the debug driver may also provide abstract high-level debug concepts, such as virtual and physical addressing at cost of higher complexity. Other variations and modifications of the embodiments disclosed herein, may be made based on the description set forth herein, without departing from the scope and spirit of the invention as set forth in the following claims.

What is claimed is:

1. A method for accessing selected resources in computer system debug environment including a host computer system, the method comprising:

on the host computer system, calling a first function;

by evaluation of the first function, encoding a data structure with target resource descriptor information for at least one of the selected resources;

thereafter, calling a second function; and by evaluation of the second function, accessing the selected resources in accordance with the target resource descriptor information encoded in the data structure.

2. The method of claim 1, further comprising:

by a single evaluation of the first function, encoding the data structure with target resource descriptor information for each of the selected resources.

3. The method as recited in claim 1 further comprising:

by multiple evaluations of the first function, encoding the target resource descriptor information for the selected resources.

4. The method as recited in claim 1 wherein the second function selects one of a plurality of groups of target resource descriptor information with which to access the selected resources.

5. The method of claim 1, wherein the computer system debug environment includes a target computer system; and wherein at least some of the selected resources reside in the target computer system.

6. The method of claim 1,
wherein the selected resource accessing includes performing a read access corresponding to at least one of the selected resources in accordance with corresponding target resource descriptor information encoded in the data structure.

7. The method of claim 1,
wherein the first and second functions are implemented with separate and distinct callable interfaces.

8. The method of claim 1,
wherein the first and second functions share at least some data context.

9. The method of claim 1, further comprising:
by evaluation of the second function, returning target resource information for each of the selected resources.

10. The method of claim 1,
wherein the returning includes filling a buffer with the target resource information.

11. The method of claim 1,
wherein the data structure is organized as an array or list.

12. The method as recited in claim 1 wherein the target resource descriptor information includes an address field and a size field, the address field identifying a target location to access and the size field indicating the size of the data associated with the address.

13. The method as recited in claim 12 wherein the target resource descriptor information further includes a space parameter identifying a type of target resource to access.

14. The method as recited in claim 13 wherein the space parameter identifies the target resource as one of physical memory space, input/output space, and register space.

15. A method of operating a host computer system coupled to a target computer system, the method comprising:
  calling a first function to store information descriptive of selected target resources in a data structure, the descriptive information including identity and access parameters for each of the selected target resources; and
  calling a second function to operate on plural of the selected target resources in accordance with the descriptive information from the data structure.

16. The method as recited in claim 15 wherein the data structure is located on the host computer and at least some of the target resources are on the target computer system.

17. The method as recited in claim 16 wherein at least some of the target resources are on the host computer system.

18. The method as recited in claim 17 wherein reading one of the target resources on the host computer system returns an indication of the available space in buffers used to store data used in read and write operations to the target processor.

19. A host computer system for operating in a debug environment including a target computer system coupled to said host computer system, the host computer system comprising:
  a data structure storing selected target resource information in a data structure, each element in the data structure storing information identifying a selected target resource; and
  a programming interface encoded in computer readable media and executable on the host computer system, the programming interface providing at least one function for causing the host computer system to access the selected set of target resources according to the selected target resource information.

20. The host computer system as recited in claim 19 wherein the programming interface further includes a second function causing the host computer system to store the elements identifying selected target resources in the data structure.

21. The host computer system as recited in claim 20 wherein each element in the data structure includes an address field and a size field, the address identifying a target location to read and the size field indicating the size of the data associated with the address.

22. A computer program product encoded on a computer readable media and executable on a host computer system, comprising:
  a first callable interface for causing the host computer system to,
    store, in a data structure, information functionally descriptive of plural target resources and access parameters therefor; and
  a second callable interface for causing the host computer system to,
    access the target resources according to the information stored in the data structure.

23. The computer program product as recited in claim 22 wherein the accessing is a read operation.

* * * * *